US005642284A

United States Patent [19]

Parupalli et al.

[11] Patent Number: 5,642,284

[45] Date of Patent: Jun. 24, 1997

[54] MAINTENANCE MONITOR SYSTEM

[75] Inventors: Prasad V. Parupalli, Peoria; David L. Dickrell, Chillicothe; Gregory S. Gauger, Pekin; Robert W. Keene, Peoria; Ronald J. Mearek, Peoria; Richard D. Rathe, Peoria; Brian T. Rolli, Peoria; Thomas R. Sandborg, Mapleton; Greg A. Schumacher, Washington; Scott G. Sinn, Morton; Michael R. Verheyen, Dunlap, all of Ill.

[73] Assignee: Caterpillar Inc., Peoria, Ill.

[21] Appl. No.: 289,592

[22] Filed: Aug. 12, 1994

[51] Int. Cl.[6] ............................ G06F 17/40; G01D 1/16; F01M 11/10

[52] U.S. Cl. ............................ 364/424.035; 364/551.01; 340/438; 73/117.3

[58] Field of Search .................... 364/424.034, 424.035, 364/551.01; 340/438, 439, 825.16; 73/117.3

[56] References Cited

U.S. PATENT DOCUMENTS

| | | | |
|---|---|---|---|
| 3,828,742 | 8/1974 | Weis | 123/102 |
| 4,067,061 | 1/1978 | Juhasz | 364/424.034 |
| 4,326,410 | 4/1982 | Butkhtiyarov et al. | 73/117.3 |
| 4,368,705 | 1/1983 | Stevenson et al. | 123/357 |
| 4,404,641 | 9/1983 | Bazarnik | 364/424.035 |
| 4,521,885 | 6/1985 | Melocik et al. | 371/29 |
| 4,533,900 | 8/1985 | Muhlberger et al. | 364/424.035 |
| 4,613,939 | 9/1986 | Paine | 364/424 |
| 4,739,482 | 4/1988 | Wrigge | 364/424.035 |
| 4,849,894 | 7/1989 | Probst | 364/424.034 |
| 4,884,054 | 11/1989 | Moon, Sr. | 364/424.035 |
| 4,933,852 | 6/1990 | Lemelson | 364/424.035 |
| 5,012,441 | 4/1991 | Ishii et al. | 364/424.034 |
| 5,041,976 | 8/1991 | Marko et al. | 364/424.034 |
| 5,060,156 | 10/1991 | Vajgant et al. | 364/424.035 |
| 5,303,163 | 4/1994 | Ebaugh et al. | 364/424.034 |
| 5,382,942 | 1/1995 | Raffa et al. | 364/424.035 |
| 5,530,647 | 6/1996 | Sem et al. | 364/424.035 |
| 5,559,706 | 9/1996 | Fujita | 364/424.034 |

OTHER PUBLICATIONS

US Application No. 08/162,820, Filed Dec. 3, 1993, "Adaptive Vehicle Display", Jaberi et al., Docket No. 90-300.5.

US Application No. 08289469, Filed Aug. 12, 1994, "Data Histogram Recording and Display System", Keene et al., Docket No. 93-471.

US Application No. 08/289,593, Filed Aug. 12, 1994, "Data Recording and Display System", Dickrell et al., Docket No. 93-473.

US Application No. 08/289,470, Filed Aug. 12, 1994, "Data Exception Reporting System", Mearek et al., Docket No. 93-474.

US Application No. 08/289,591, Filed Aug. 12, 1994, "Diagnostic Data Reporting System", Mearek et al., Docket No. 93-476.

*Primary Examiner*—Kevin J. Teska
*Assistant Examiner*—Tyrone V. Walker
*Attorney, Agent, or Firm*—Stephen L. Noe

[57] ABSTRACT

The system is provided for controllably monitoring data associated with operational characteristics of an engine. The system determines a maintenance activity requirement based on such characteristics. The system includes a plurality of transducers associated with the engine and connected to a programmable logic device. Signals from the transducers are continuously monitored and stored in an associated storage device. In response to predetermined sets of operational characteristics, an indication of when maintenance is due on the engine is produced by the logic device.

9 Claims, 5 Drawing Sheets

MAINTENANCE MONITOR SYSTEM

TECHNICAL FIELD

This invention relates generally to a system for monitoring data associated with preselected characteristics of an engine and, more particularly, to a programmable device for controllably monitoring data associated with preselected operational characteristics of an engine.

BACKGROUND ART

Many vehicles and engines associated with vehicles in use today include computerized information and control systems. Such systems typically include a variety of sensors positioned about the vehicle and engine to sense various operating conditions and to develop corresponding electrical signals. These signals are delivered to a control computer or logic device where they are utilized in a controllable and programmable manner to affect the operation of the vehicle and associated engine. Such engine controls are relatively common in the case of modern vehicles, both on and off road.

Maintenance is always a consideration in any vehicle or engine usage situation. The inclusion of an electronic control module with such a vehicle and engine combination invites the use of the control module to also monitor and notify the user of a desired or required maintenance interval. This interval is preferably flexible enough to allow that its duration be determined by more than one characteristic. For example, merely measuring the number of miles from one maintenance period to the next is often not sufficient for a maintenance indication.

The present invention is directed to overcoming one or more of the problems as set forth above.

DISCLOSURE OF THE INVENTION

In one aspect of the present invention an apparatus for controllably monitoring data associated with preselected operational characteristics of an engine is provided. The engine has a predetermined engine oil sump capacity and a plurality of transducers respectively connectable to a programmable logic device and adapted to produce responsive parameter signals. A storage device is connected to the logic device. The parameter signals are received by the logic device and controllably manipulated to produce responsive information signals. The logic device produces a maintenance due signal having a value responsive to the oil capacity of the engine oil sump, the average of one of the actual distance and time per unit of fuel attained by the engine during a preceding predetermined time internal, and a preselected constant ratio of engine fuel to engine oil.

In a second aspect of the present invention, a method is provided for controllably monitoring data associated with the preselected operational characteristics of an engine. A plurality of transducers are respectively connectable to a logic device and are adapted to produce parameter signals responsive to the respective engine and vehicle parameters. A storage device is connected to the logic device. The method includes the steps of producing information signals in response to the operational characteristics of the engine. A maintenance due signal is produced having a value responsive to the oil capacity of the engine oil sump, the average of one of the actual distance and time per unit of fuel attained by the engine during a preceding predetermined time internal, and a preselected constant ratio of engine fuel to engine oil. The maintenance due signal is delivered to the storage device.

The present invention provides a flexible system for determining when maintenance is due on an engine and for providing a suitable indication that such maintenance is due.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
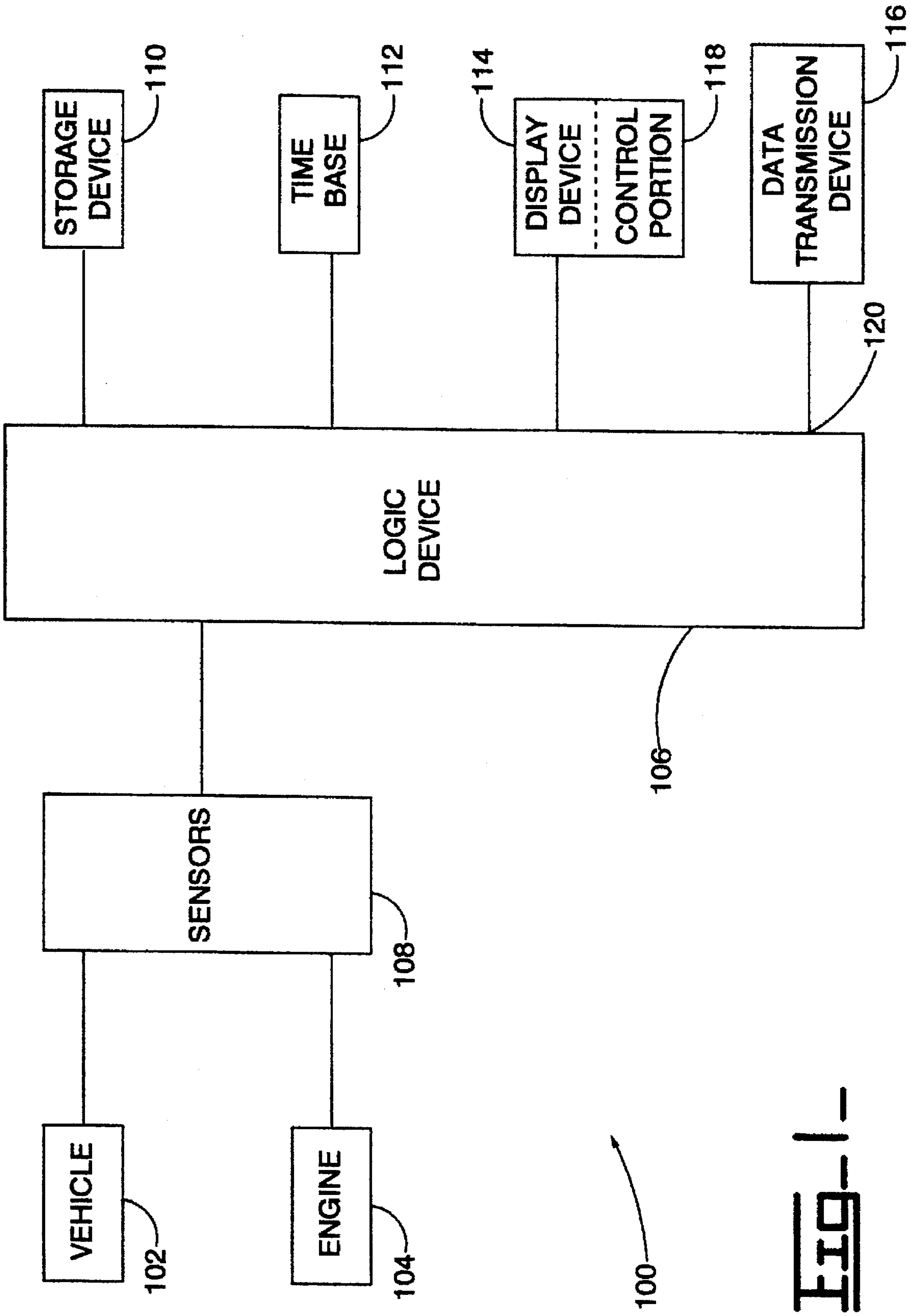
FIG. 1 is a block diagram of one embodiment of the present invention.

Referring first to FIG. 1, an apparatus embodying certain of the principles of the present invention is generally indicated by the reference numeral 100. It should be understood that the following detailed description relates to the best presently known embodiment of the apparatus 100. However, the apparatus 100 can assume numerous other embodiments, as will become apparent to those skilled in the art, without departing from the appended claims.

In FIG. 1, the apparatus 100 is adapted to controllably sense, record, and selectively display data associated with operational characteristics of a vehicle 102 and associated engine 104. The apparatus 100 includes a programmable logic device 106 and a plurality of transducers 108 respectively connectable to the programmable logic device 106. Each transducer 108 is adapted to produce parameter signals responsive to respective preselected engine and vehicle parameters. A storage device 110 and a local display device 112 are each connected to the programmable logic device 106. The apparatus 100 also includes a time base 114 associated with the programmable logic device 106 and a data transmission device 116 likewise associated with the logic device 106.

The parameter signals produced by the transducers 108 are received by the programmable logic device 106 and controllably manipulated to produce predetermined information signals. The information signals are delivered to the storage device and each signal is individually accumulated in the storage device 110 during a predetermined period.

Figure 2:
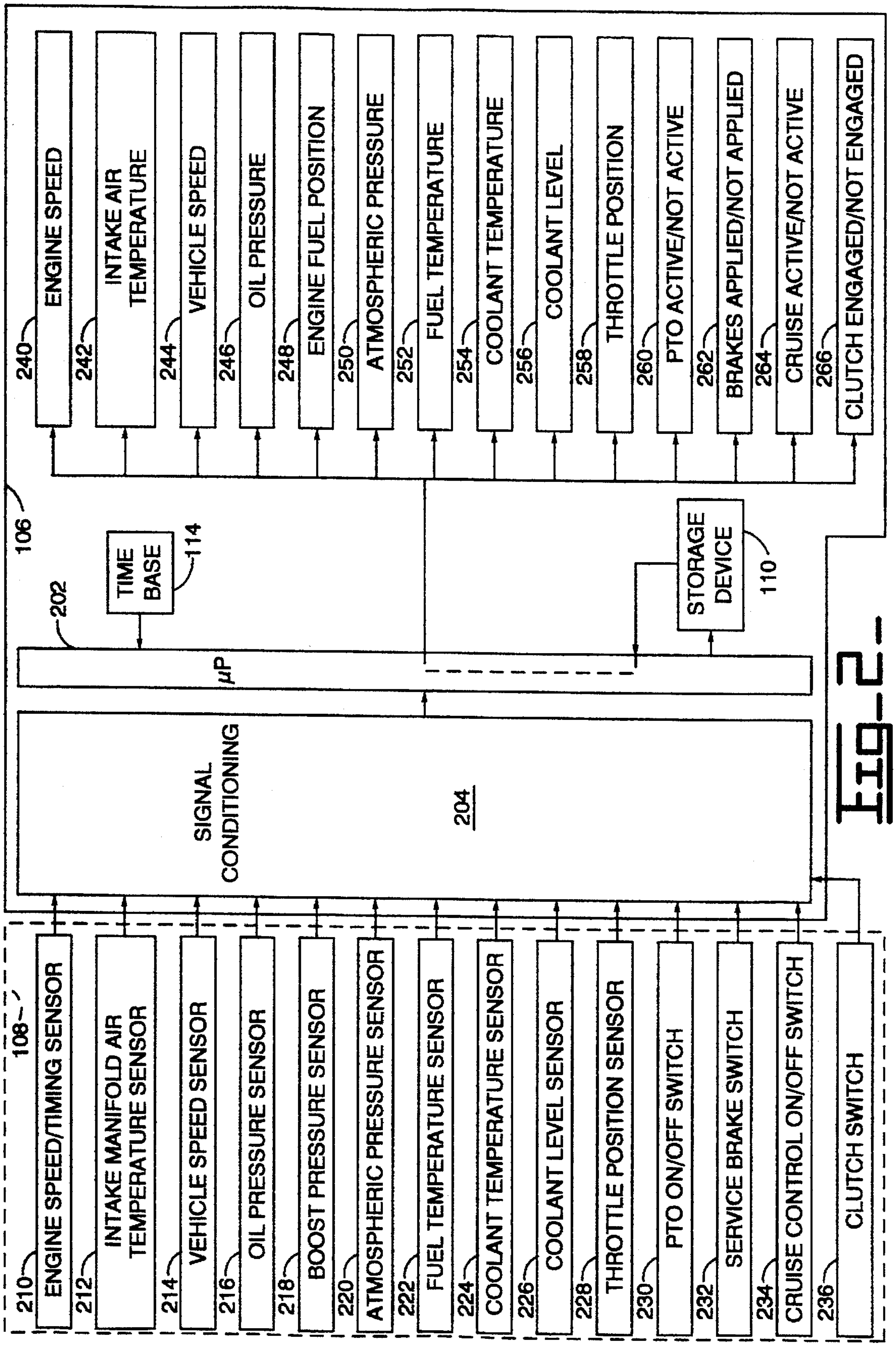
FIG. 2 is a more detailed block diagram of a logic device and a plurality of sensors associated with one embodiment of the present invention.

In FIG. 2, a more detailed view of some of the elements shown in FIG. 1 is set forth. FIG. 2 illustrates the programmable logic device 106 including a microprocessor 202, and the plurality of signal conditioning elements 204 associated with the processor 202. The plurality of transducers 108 are connected to the logic device 106 through the signal conditioning element 204. In a preferred embodiment of the apparatus 100, the transducers 108 include the following individual elements: engine speed/timing sensor 210, intake manifold air temperature sensor 212, vehicle speed sensor 214, oil pressure sensor 216, boost pressure sensor 218, atmospheric pressure sensor 220, fuel temperature sensor 222, coolant temperature sensor 224, coolant level sensor 226, throttle position sensor 228, PTO on/off switch 230, service brake switch 232, cruise control on/off switch 234, and clutch switch 236.

The parameter signals produced by the plurality of transducers 108 are processed by the microprocessor 202 to produce responsive information signals. In a preferred embodiment of the present invention, the information signals responsive to the sensors 210–236 include engine speed 240, intake air temperature 242, vehicle speed 244, oil pressure 246, engine fuel position 248, atmospheric pressure 250, fuel temperature 252, coolant temperature 254, coolant level 256, throttle position 258, PTO active/not active 260, brakes applied/not applied 262, cruise active/not active 264, and clutch engaged/not engaged 266.

The storage device 110 is connected to the microprocessor 202 of the programmable logic device 106. In the preferred embodiment, the storage device 110 is a form of random access memory. In a preferred embodiment of the apparatus 100, the random access memory can include both volatile and non-volatile memory elements enabling it to store both transitional and static data.

Referring again to FIG. 1, the local display device 112 includes a control portion 118. The control portion 118 of the display device 112 is, for example, an alphanumeric keyboard of the type commonly associated with microcomputers. The control portion 118 could also be a more simple keyboard device or could even be voice actuated or otherwise amenable to the provision of control signals in response to manual input. Likewise, the display device 112 in the preferred embodiment is a CRT or liquid crystal display device capable of portraying alphanumeric information. However, this too could be any suitable display device including a paper based printer or an audible voice synthesis device.

The data transmission device 116 is connected through a communication port 120 to the programmable logic device 106. The data transmission device 116 is of common design and is sufficient to deliver selected ones of the information signals to a remote location. For example, the data transmission device could be a radio radiating standard radio signals, or a microwave, infrared, or other type transmission device, and can include satellite link capability. Various types of data transmission devices are well known in the art of communicating signals to remote locations and any suitable device is anticipated to be useable with the apparatus 100.

Also, in a preferred embodiment of the apparatus 100, access to and manipulation of or removal of the information signals accumulated in the storage device 110 is controllably restricted utilizing one or more levels of password protection. Again, the use of password protection for restricting access to data elements in a computerized system is well known in the art.

FIGS. 3–7 are flowcharts illustrating a computer software program for implementing the preferred embodiment of the present invention. The program depicted in these flowcharts is particularly well adapted for use with the microcomputer and associated components described above, although any suitable microcomputer may be utilized in practicing an embodiment of the present invention. These flowcharts constitute a complete and workable design of the preferred software program, and have been reduced to practice on a microcomputer system. The software program may be readily coded from these detailed flowcharts using the instruction set associated with any suitable conventional microcomputer. The process of writing software code from flowcharts such as these is a mere mechanical step for one skilled in the art.

Figure 3:
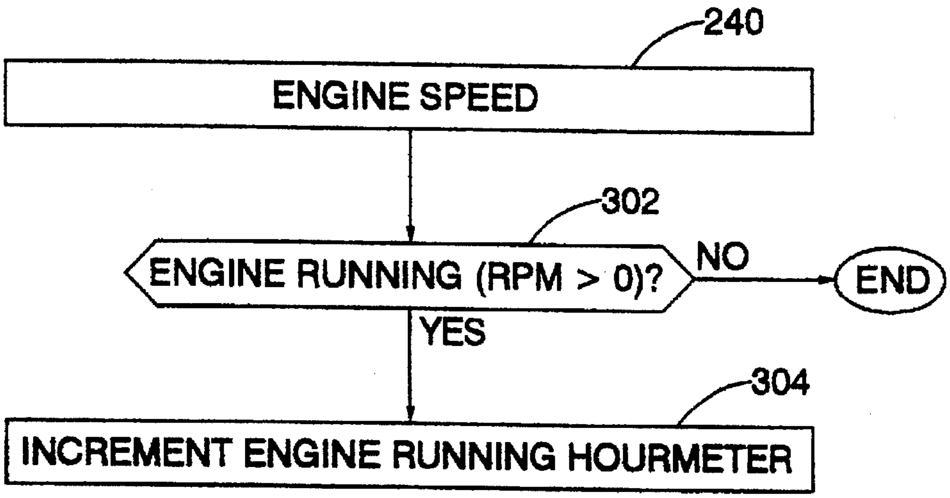
FIGS. 3–7 are elements of a flowchart of software used with the described embodiment of the present invention.

The first set of flowcharts illustrates the logic utilized by the programmable logic device 106 to accumulate information signals relating to operational characteristics of the vehicle 102 and associated engine 104. These characteristics are then used to determine when maintenance, such as engine oil changes, should be performed. In FIG. 3 the engine speed sensor 210 delivers a signal relating to engine RPM from the block 240 to the block 302 of the flowchart. If the RPM is not greater than zero or if the engine is not running this module ends. If the engine RPM is greater than zero the amount of time that that condition is present is accumulated in the storage device 110 by incrementing an associated hourmeter register in the block 304.

Figure 4:
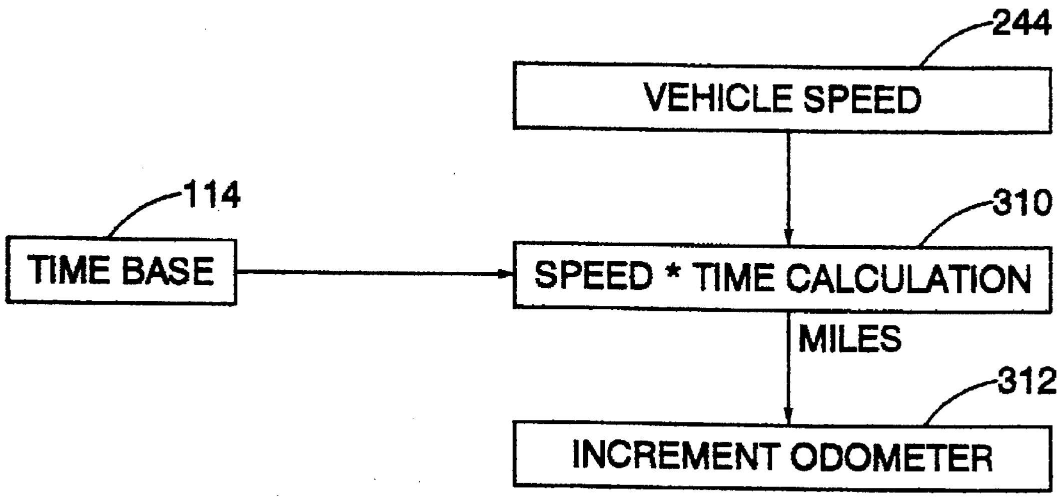

Accumulated vehicle miles are dealt with in the next module at FIG. 4. Vehicle speed from the vehicle speed sensor 214 is delivered to the program logic from the block 244 at the block 310, along with a time signal from the time base 114. A speed versus time calculation is performed resulting in miles traveled by the vehicle 102. The total miles are accumulated in the storage device 110 by incrementing an odometer register at the block 312.

Figure 5:
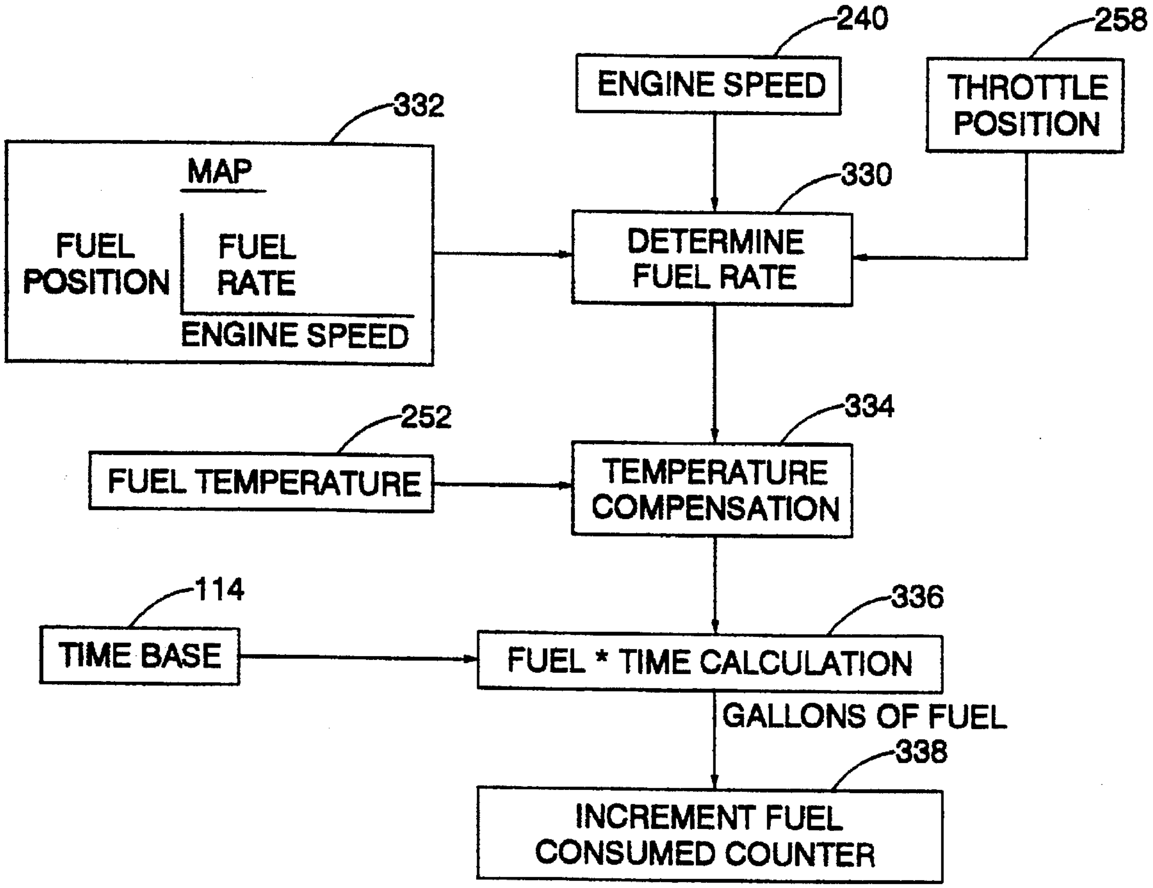

Fuel consumed is another desired information signal that is dealt with in FIG. 5. Inputs to this flowchart are the engine speed from the block 240 and engine fuel position from the throttle position sensor 228 and the block 258. Each of these is delivered to the block 330 in which fuel rate is determined by utilizing a look up map 332, which maps engine speed against fuel position and plots the resulting fuel rate. The fuel rate signal is then delivered to the block 334 where a fuel temperature correction or compensation is conducted by utilizing the fuel temperature signal delivered by the fuel temperature sensor 222 and the block 252. The corrected fuel rate is then delivered to the block 336 where it is multiplied by the time from the time base 114 to produce gallons of fuel consumed. This information signal is delivered to the storage device 110 at the block 338 where the fuel consumed register is incremented.

Figure 6:
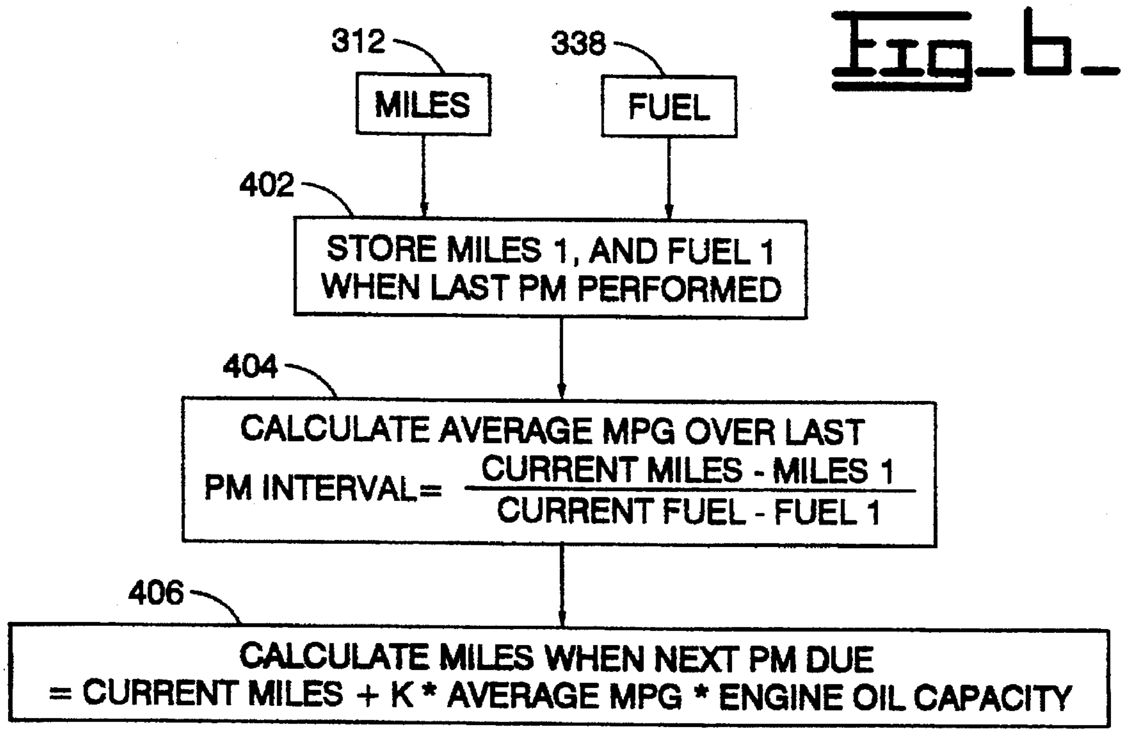

Once the ability to determine engine hours, vehicle miles, and fuel consumed is available it is a relatively simple matter to provide a system that will use this information to determine when maintenance is due and to present an appropriate indication. FIG. 6 describes such a system. Upon performing a periodic maintenance of an engine, typically including an oil change and filter, the total number of miles accumulated from the block 312 and the total amount of fuel consumed at that point from the block 338 are stored in a pair of registers at the block 402 in the storage device 110. For example, total miles are stored in a register indicated as "Miles 1" and total fuel burned is stored in a register identified as "Fuel 1." The average miles per gallon during the most recent preventive maintenance interval can then be calculated as in the block 404 by subtracting Miles 1 from the current miles at any time and Fuel 1 from the current fuel at any time and taking the quotient.

Knowing the average miles per gallon, one can then calculate, as in block 406, the number of miles remaining until the next periodic maintenance is due. This is done by solving the formula shown in the block 406, which multiplies the engine oil sump capacity in, for example, quarts, times the average miles per gallon, times a constant, and adding this value to the current mileage. This number of miles remaining until the next scheduled maintenance can then be displayed on the display device 112.

Figure 7:
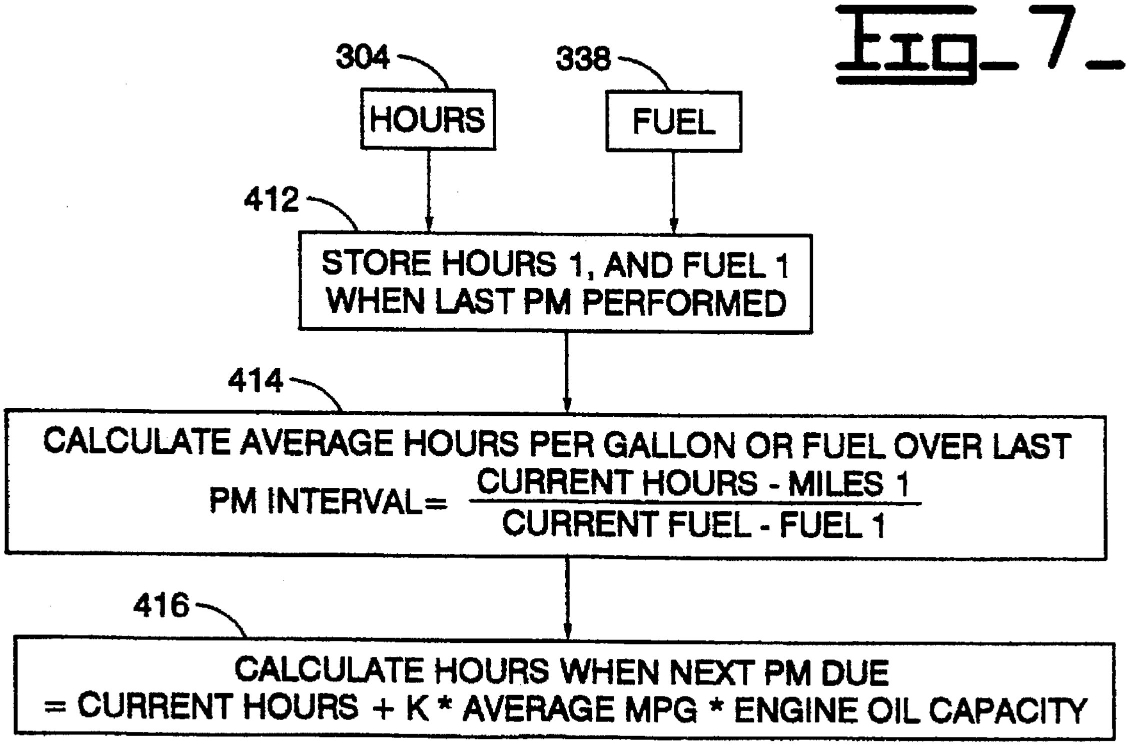

In like manner, as shown in FIG. 7, the number of hours remaining to a periodic maintenance can be automatically determined by the system. The total hours that the engine has run from the block 304 and the total amount of fuel consumed from the block 338 are each delivered to the block 412 and are stored each time a periodic maintenance interval is completed. Using this information, stored as "Hours 1"

and "Fuel 1", one can then calculate the average hours per gallon of fuel consumed during the past preventative maintenance interval as shown in the block 414. This is done by subtracting the Hours 1 from the current hours and the Fuel 1 from the current fuel and taking the quotient. This average is then delivered to the block 416 where the number of hours remaining until the next preventative maintenance interval is calculated by multiplying the engine oil sump capacity, times the average hours per gallon, times a constant, and adding the current hours to that.

Industrial Applicability

The ability to determine and display when a maintenance event is next due is an important one to the owner or operator of a vehicle utilizing an engine or to the owner of any sort of a stationary engine. The time remaining to the next scheduled maintenance event is normally not a constant but varies according to the amount of fuel consumed by the engine over a period of time and the amount of oil contained in the sump portion of the engine. This is because the normal operation of an internal combustion engine causes the lubricating oil to become diluted by the process of burning fuel in the engine cylinders. Therefore, the best indication of when maintenance is due may not be a simple calculation based on a predetermined number of miles or hours of operation, but instead can advantageously be related to the amount of fuel consumed and the amount of oil in the engine sump. The instant invention takes such items into account and provides a more accurate method of determining when maintenance is due.

In addition, assuming that a suitable input device control portion 118 is connected to the programmable logic device 106, it is a simple matter to cause the apparatus 100 to operate in a purely manual mode where it simply measures the number of miles or number of hours elapsed since the last maintenance event and compares those to a preselected maximum number of hours or miles or fuel consumed. This number can be either preset at the factory or can be input through an alphanumeric input device. Once the first one of the preselected conditions is met, the maintenance indicator will alert the operator to the need for a scheduled maintenance. While the preferred embodiment of the instant invention does provide for such a prescheduled maintenance interval, it is believed that the automatic determination is often the better choice. However, particular operating conditions might indicate otherwise.

Other aspects, objects, advantages of this uses can be obtained from a study of the drawings, the disclosure, and the appended claims.

We claim:

1. An apparatus to controllably monitor data associated with preselected operational characteristics of an engine, said engine having a preselected engine oil sump capacity, comprising:

a programmable logic device;

a plurality of transducers respectively connectable to said programmable logic device and each adapted to produce parameter signals responsive to respective preselected engine and vehicle parameters;

a storage device connected to said programmable logic device;

wherein said parameter signals are received by said programmable logic device and controllably manipulated by said programmable logic device to produce responsive information signals, and wherein said programmable logic device produces a maintenance due signal having a value responsive to the oil capacity of said engine oil sump, the average of one of the actual distance and time per unit of fuel attained by said engine during a preceding predetermined time interval, and a preselected constant ratio of engine fuel to engine oil, said maintenance due signal being delivered by said programmable logic device to said storage means.

2. An apparatus, as set forth in claim 1, including a display device connectable to said programmable logic device, and wherein said maintenance due signal value is compared with the value of the respective information signal corresponding to one of the actual current distance and time, and a maintenance due indication is delivered to said display device in response to said actual signal having a value equal to or greater than said maintenance due signal.

3. An apparatus, as set forth in claim 2, wherein said predetermined time interval is the most recent prior completed maintenance interval.

4. An apparatus, as set forth in claim 2, including a communication port connected to said programmable logic device and a data transmission device connected to said communication port, said data transmission device being sufficient to deliver said maintenance due signal to a remote location.

5. An apparatus, as set forth in claim 1, including a control portion connectable to said programmable logic device and adapted to deliver a set of manually selectable limits associated with at least one of distance and time and fuel consumption to said logic device, said selectable parameters being storable in said storage device, and wherein said maintenance due signal is produced in response to the first occurrence of an actual one of said parameter signals attaining a value equal to said one of said distance and time and fuel consumption limits.

6. A method for controllably monitoring data associated with preselected operational characteristics of an engine, said engine having a preselected engine oil sump capacity, a plurality of transducers respectively connectable to a programmable logic device and each adapted to produce parameter signals responsive to respective preselected engine and vehicle parameters, and a storage device connected to said programmable logic device, comprising the steps of:

producing information signals in response to said operational characteristics of said engine;

producing a maintenance due signal having a value responsive to the oil capacity of said engine oil sump, the average of one of the actual distance and time per unit of fuel attained by said engine during a preceding predetermined time interval, and a preselected constant ratio of engine fuel to engine oil; and, delivering said maintenance due signal to said storage means.

7. A method, as set forth in claim 6, including a display device connectable to said programmable logic device, and including the step of comparing said maintenance due signal value with the value of the respective information signal corresponding to one of the actual current distance and time, and delivering a maintenance due indication to said display device in response to said actual signal having a value equal to or greater than said maintenance due signal.

8. A method, as set forth in claim 6, wherein said predetermined time interval is the most recent prior completed maintenance interval.

9. A method, as set forth in claim 6, including the step of delivering said maintenance due signal to a remote location.

* * * * *